US010263294B2

United States Patent
Saka et al.

(10) Patent No.: US 10,263,294 B2
(45) Date of Patent: Apr. 16, 2019

(54) LITHIUM ION SECONDARY BATTERY

(71) Applicant: TOYOTA JIDOSHA KABUSHIKI KAISHA, Toyota-shi, Aichi (JP)

(72) Inventors: Hideyuki Saka, Toyota (JP); Yukihiro Okada, Shijyounawate (JP); Keiichi Takahashi, Nishinomiya (JP); Kaoru Inoue, Hirakata (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 15/622,481

(22) Filed: Jun. 14, 2017

(65) Prior Publication Data
US 2017/0373352 A1 Dec. 28, 2017

(30) Foreign Application Priority Data

Jun. 23, 2016 (JP) ................. 2016-124852

(51) Int. Cl.
*H01M 2/00* (2006.01)
*H01M 10/42* (2006.01)
(Continued)

(52) U.S. Cl.
CPC ..... *H01M 10/4235* (2013.01); *H01M 2/1077* (2013.01); *H01M 2/345* (2013.01);
(Continued)

(58) Field of Classification Search
CPC ...................................... H01M 2/00
See application file for complete search history.

(56) References Cited

U.S. PATENT DOCUMENTS

2004/0076882 A1 4/2004 Hosoya et al.
2006/0204845 A1 9/2006 Chang et al.
(Continued)

FOREIGN PATENT DOCUMENTS

JP         4032744 B2    1/2008
JP       2011-018645 A   1/2011
(Continued)

*Primary Examiner* — Jacob B Marks
(74) *Attorney, Agent, or Firm* — Sughrue Mion, PLLC

(57) ABSTRACT

Provided is a lithium ion secondary battery which has a low internal resistance in a low-SOC region and a sufficiently large amount of gas generated during overcharge. The lithium ion secondary battery disclosed herein includes an electrode body having a positive electrode and a negative electrode, and a nonaqueous electrolytic solution. The lithium ion secondary battery further includes a pressure-type safety mechanism. The nonaqueous electrolytic solution includes a gas generating agent. The positive electrode has a positive electrode active material layer including a positive electrode active material. The positive electrode active material includes a lithium transition metal composite oxide represented by $LiNi_aCo_bMn_cO_2$ wherein a, b and c satisfy the following conditions: $0.35 \leq a \leq 0.45$, $0.15 \leq b \leq 0.25$, $0.35 \leq c \leq 0.45$, and $a+b+c=1$, and a lithium transition metal composite oxide represented by $LiNi_xCo_yMn_zO_2$ wherein x, y and z satisfy the following conditions: $0.35 \leq x \leq 0.45$, $0.45 \leq y \leq 0.55$, $0.05 \leq z \leq 0.15$, and $x+y+z=1$, and the mass ratio of the oxides is 60:40 to 85:15.

2 Claims, 2 Drawing Sheets

(51) Int. Cl.
*H01M 2/10* (2006.01)
*H01M 2/34* (2006.01)
*H01M 4/36* (2006.01)
*H01M 4/505* (2010.01)
*H01M 4/525* (2010.01)
*H01M 10/0525* (2010.01)
*H01M 10/0587* (2010.01)

(52) U.S. Cl.
CPC ........... *H01M 4/364* (2013.01); *H01M 4/505* (2013.01); *H01M 4/525* (2013.01); *H01M 10/0525* (2013.01); *H01M 10/0587* (2013.01); *H01M 2200/20* (2013.01); *H01M 2220/20* (2013.01)

(56) References Cited

U.S. PATENT DOCUMENTS

| | | | |
|---|---|---|---|
| 2006/0257745 A1* | 11/2006 | Choi | B82Y 30/00 |
| | | | 429/231.3 |
| 2010/0279156 A1 | 11/2010 | Kim et al. | |
| 2013/0273429 A1 | 10/2013 | Yu | |
| 2015/0303526 A1* | 10/2015 | Hamaguchi | H01M 10/4235 |
| | | | 429/94 |

FOREIGN PATENT DOCUMENTS

| | | |
|---|---|---|
| JP | 2011-181528 A | 9/2011 |
| JP | 2011-228293 A | 11/2011 |
| JP | 5394578 B2 | 1/2014 |
| KR | 10-2004-0072023 A | 8/2004 |
| KR | 10-2015-0121663 A | 10/2015 |

* cited by examiner

[Fig. 1]
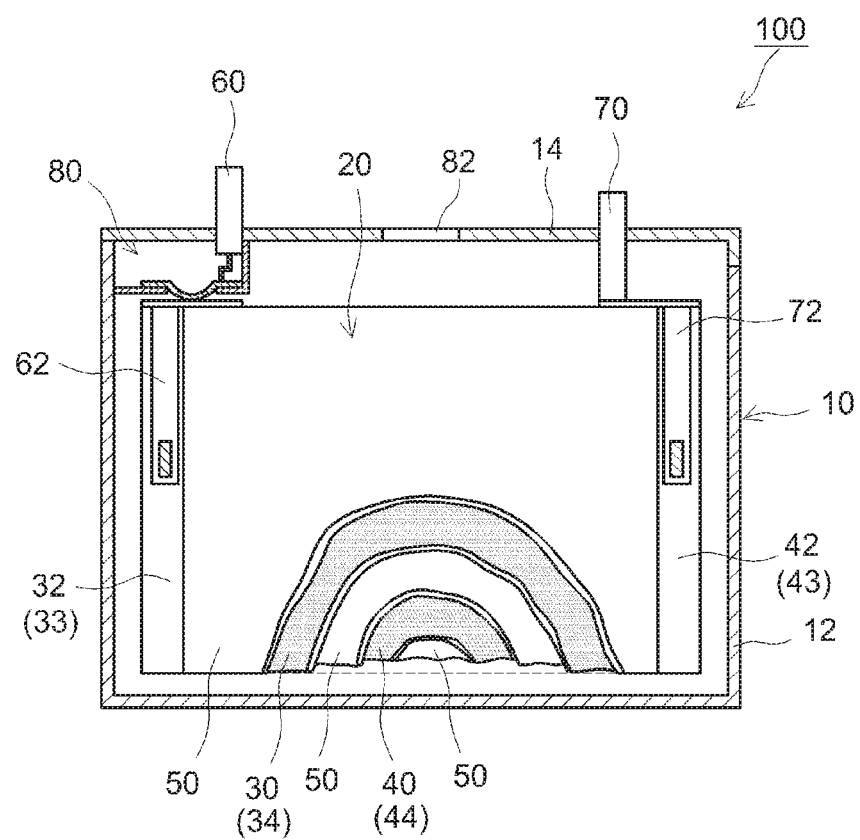

[Fig. 2]
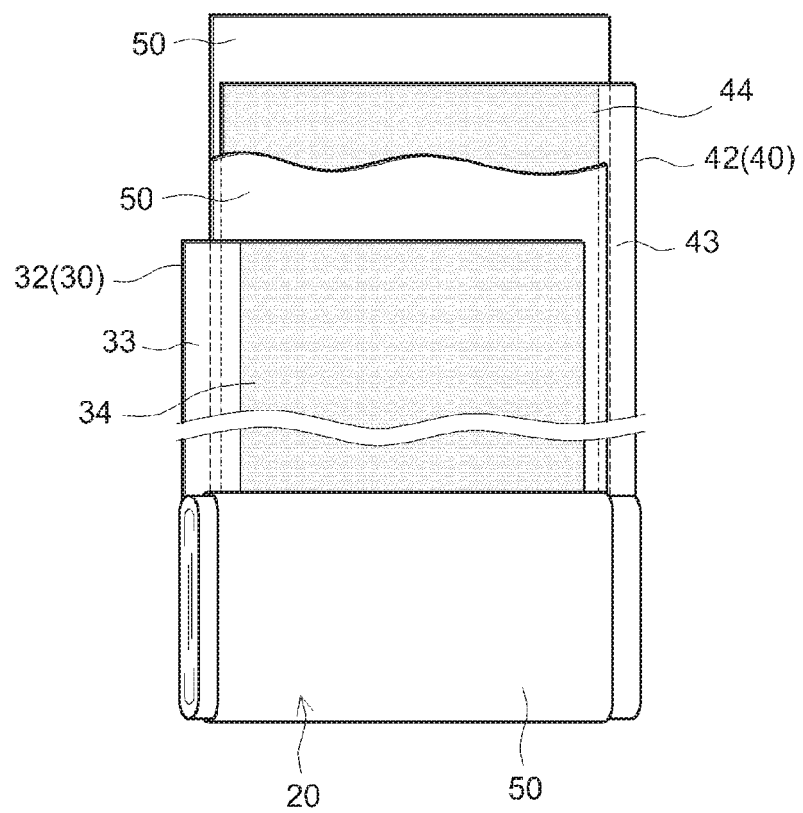

LITHIUM ION SECONDARY BATTERY

BACKGROUND OF THE INVENTION

1. Field of the Invention

The present teaching relates to a lithium ion secondary battery. The present application claims priority to Japanese Patent Application No. 2016-124852 filed on Jun. 23, 2016, the entire contents of which are incorporated herein by reference.

2. Description of the Related Art

Since lithium ion secondary batteries have a lower weight and a higher energy density than those of the conventional batteries, lithium ion secondary batteries have been used in recent years as the so-called portable power sources for personal computers, mobile terminals and the like, and as power sources for driving vehicles. In particular, lithium ion secondary batteries are expected to become more widely used in the future as high-output power sources for driving vehicles such as electric vehicles (EV), hybrid vehicles (HV) and plug-in hybrid vehicles (PHV).

Positive electrode active materials have been variously studied to improve characteristics of lithium ion secondary batteries. Thus, Japanese Patent Application Publication No. 2011-228293 suggests using a lithium nickel cobalt manganese composite oxide together with an olivine-type lithium iron phosphate (LiFePO$_4$) as a positive electrode active material with the object of improving the output in a low-state of charge (SOC) region.

Meanwhile, lithium ion secondary batteries are demanded to have high safety, in particular, high safety during overcharge. A lithium ion secondary battery is generally a sealed battery, and when for some reason the amount of current flowing during charging becomes not less than a predetermined amount and an overcharged state is reached, the battery voltage increases, the internal pressure of the battery rises and the battery temperature also rises. Accordingly, various safety measures have been taken against overcharge in lithium ion secondary batteries, and one of the safety measures is the use of a pressure-type safety mechanism together with a gas generating agent. In a lithium ion secondary battery using a pressure-type safety mechanism together with a gas generating agent, gas is generated by the gas generating agent during overcharge. As a result, the internal pressure of the battery case rises and the pressure-type safety mechanism is actuated, whereby the progress of overcharge is suppressed.

SUMMARY OF THE INVENTION

When a lithium nickel cobalt manganese composite oxide and an olivine-type lithium iron phosphate are used together as a positive electrode active material, as described in Japanese Patent Application Publication No. 2011-228293, an output improvement effect in a low-SOC region can be observed, that is, the resistance in the low-SOC region is reduced. However, the study conducted by the inventors of the present teaching has demonstrated that when such a positive electrode active material is used in a lithium ion secondary battery using a pressure-type safety mechanism together with a gas generating agent, the amount of gas generated during overcharge is small and, therefore, the pressure-type safety mechanism may not be actuated.

Accordingly, it is an objective of the present teaching to provide a lithium ion secondary battery using a pressure-type safety mechanism together with a gas generating agent, which has a low internal resistance in a low-SOC region and a sufficiently large amount of gas generated during overcharge.

The lithium ion secondary battery disclosed herein includes an electrode body having a positive electrode and a negative electrode, and a nonaqueous electrolytic solution. The lithium ion secondary battery further includes a pressure-type safety mechanism for changing an energization state according to a battery internal pressure. The nonaqueous electrolytic solution includes a gas generating agent which reacts at a voltage equal to or higher than a predetermined voltage to generate a gas. The positive electrode has a positive electrode active material layer including a positive electrode active material. The positive electrode active material includes a first lithium transition metal composite oxide represented by the general formula LiNi$_a$Co$_b$Mn$_c$O$_2$ wherein a, b and c are values satisfying the following conditions: $0.35 \leq a \leq 0.45$, $0.15 \leq b \leq 0.25$, $0.35 \leq c \leq 0.45$, and $a+b+c=1$, and a second lithium transition metal composite oxide represented by the general formula LiNi$_x$Co$_y$Mn$_z$O$_2$ wherein x, y and z are values satisfying the following conditions: $0.35 \leq x \leq 0.45$, $0.45 \leq y \leq 0.55$, $0.05 \leq z \leq 0.15$, and $x+y+z=1$. A mass ratio of the first lithium transition metal composite oxide and the second lithium transition metal composite oxide is 60:40 to 85:15.

According to such a configuration, the internal resistance in a low-SOC region can be reduced by the synergistic effect of the first lithium transition metal composite oxide and the second lithium transition metal composite oxide. Further, as a result of including the first lithium transition metal composite oxide, which is likely to generate a large amount of gas during overcharge, at a proportion equal to or higher than a predetermined value, the amount of gas generated during overcharge becomes sufficiently large. Thus, according to such a configuration, a lithium ion secondary battery having a small internal resistance in a low-SOC region and a sufficiently large amount of gas generated during overcharge is provided.

In a desired embodiment of the lithium ion secondary battery disclosed herein, the mass ratio of the first lithium transition metal composite oxide and the second lithium transition metal composite oxide is 60:40 to 75:25.

According to such a configuration, gas can be rapidly generated during overcharge.

BRIEF DESCRIPTION OF THE DRAWINGS

FIG. 1 is a cross-sectional view schematically showing the configuration of a lithium ion secondary battery according to an embodiment of the present teaching; and FIG. 2 is a schematic diagram showing the configuration of an electrode body used in the lithium ion secondary battery according to an embodiment of the present teaching.

DESCRIPTION OF THE PREFERRED EMBODIMENTS

Embodiments of the present teaching will be described hereinbelow with reference to the drawings. Incidentally, matters necessary for the implementation of the present teaching (for example, a general configuration and manufacturing process of a lithium ion secondary battery which do not characterize the present teaching), other than those specifically mentioned in the present specification, can be considered as design matters for a person skilled in the art which are based on the related art in the pertinent field. The present teaching can be implemented based on the contents disclosed in this specification and common technical sense in the pertinent field. Further, in the following drawings, the same reference numerals are assigned to members and parts that exhibit the same action. The dimensional relationship (e.g., length, width, thickness, etc.) in the drawings does not reflect the actual dimensional relationship.

In the present specification, the term "secondary battery" refers to a power storage device in general that can be repeatedly charged and discharged, and is a term inclusive of a power storage element such as the so-called power storage battery and electric double layer capacitor. Further, in the present specification, the term "lithium ion secondary battery" refers to a secondary battery which uses lithium ions as a charge carrier and in which charging and discharging are realized by charge transfer by lithium ions between positive and negative electrodes.

FIG. 1 is a cross-sectional view schematically showing the configuration of a lithium ion secondary battery 100 according to the present embodiment. As shown in FIG. 1, the lithium ion secondary battery 100 includes an electrode body (in the present embodiment, a wound electrode body) 20 having a positive electrode 30, a negative electrode 40, and a separator 50 interposed between the positive electrode 30 and the negative electrode 40, and a nonaqueous electrolytic solution (not shown in the figure). The electrode body 20 and the nonaqueous electrolytic solution are accommodated in a battery case 10.

The battery case 10 made from various kinds of materials, for example, a metal such as aluminum, an alloy thereof, iron, and an alloy thereof, a resin such as polyamide, and a laminate film can be suitably used. In the example shown in FIG. 1, the battery case 10 has an angular shape and is made of an aluminum alloy. This case is provided with a flat bottomed box-shaped case body (exterior case) 12 with its upper end open, and a lid 14 that closes the opening of the case body 12.

A positive electrode terminal 60 electrically connected to the positive electrode 30 of the wound electrode body 20 and a negative electrode terminal 70 electrically connected to the negative electrode 40 of the wound electrode body 20 are provided on the upper surface (i.e., the lid 14) of the battery case 10. Further, a pouring port (not shown in the figure) for pouring the nonaqueous electrolytic solution into the case body 12 in which the wound electrode body 20 is accommodated is typically formed in the lid 14. Furthermore, the lid 14 is provided with a safety valve 82. The safety valve 82 is configured to open in order to release the internal pressure when the internal pressure rises to or above a predetermined value (for example, about 0.3 MPa to 1.0 MPa) by the gas generated in the battery case 10.

A pressure-type safety mechanism 80 that changes the energization state according to the battery internal pressure is provided inside the battery case 10. In the present embodiment, a current interrupting mechanism (CID) that is actuated when the pressure inside the battery case 10 rises to or above a predetermined pressure is provided as the pressure-type safety mechanism 80. The pressure-type safety mechanism (CID in the present embodiment) 80 may be configured to cut a conductive path (for example, a charging path) extending from at least one electrode terminal to the electrode body 20 when the internal pressure of the battery case 10 rises, and this mechanism is not limited to a specific shape. Typically, the pressure-type safety mechanism 80 is provided between the positive electrode terminal 60 and the electrode body 20 and configured so as to cut the conductive path extending from the positive electrode terminal 60 to the electrode body 20 when the internal pressure of the battery case 10 rises. Normally, the pressure at which the pressure-type safety mechanism 80 is actuated is set lower than the pressure at which the safety valve 82 is actuated.

Further, in the present embodiment, the CID that changes the energization state by cutting the conductive path extending from the electrode terminal to the electrode body 20 in accordance with the battery internal pressure is used as the pressure-type safety mechanism 80 but the pressure-type safety mechanism 80 is not limited to such a configuration as long as overcharge can be suppressed by changing the energization state according to the battery internal pressure. For example, a pressure-type safety mechanism may be used that changes the energization state by electrically connecting the positive electrode and the negative electrode when the battery internal pressure rises to or above a predetermined pressure. In such a pressure-type safety mechanism, an electrical short circuit is induced between the positive electrode and the negative electrode by electrically connecting the positive electrode and the negative electrode. As a result, the current is discharged or cut off, and the progress of overcharge is suppressed. An example of such a pressure-type safety mechanism is as described in Japanese Patent Application Publication No. 2011-18645. The pressure-type safety mechanism disclosed in Japanese Patent Application Publication No. 2011-18645 includes a variable plate, and when the battery internal pressure rises to or above a predetermined pressure, the variable plate is deformed to cause an electrical short circuit between the positive electrode and the negative electrode.

FIG. 2 is a schematic diagram showing the configuration of the electrode body 20 used in the lithium ion secondary battery 100 according to the present embodiment. In FIG. 2, the wound electrode body 20 is constituted by the long positive electrode (positive electrode sheet) 30, the long negative electrode (negative electrode sheet) 40, and the long separator (separator sheet) 50.

The positive electrode sheet 30 typically includes a positive electrode current collector 32 and a positive electrode active material layer 34. As shown in FIG. 2, the positive electrode current collector 32 is provided with a portion where the positive electrode active material layer 34 is formed and a positive electrode current collector exposed portion 33 where the positive electrode active material layer 34 is not provided and the positive electrode current collector 32 is exposed. The positive electrode current collector exposed portion 33 is provided at one end of the positive electrode current collector 32. Although not explicitly shown in the drawing, in the present embodiment, the positive electrode active material layer 34 is provided on both surfaces of the positive electrode current collector 32. However, the positive electrode active material layer 34 may be provided only on one of the surfaces.

The negative electrode sheet 40 typically includes a negative electrode current collector 42 and a negative electrode active material layer 44. As shown in FIG. 2, the negative electrode current collector 42 is provided with a portion where the negative electrode active material layer 44 is formed and a negative electrode current collector exposed portion 43 where the negative electrode active material layer 44 is not provided and the negative electrode current collector 42 is exposed. The negative electrode current collector exposed portion 43 is provided at one end of the negative electrode current collector 42. Although not explicitly shown in the drawing, in the present embodiment, the negative electrode active material layer 44 is provided on both surfaces of the negative electrode current collector 42. However, the negative electrode active material layer 44 may be provided only on one of the surfaces.

In the present embodiment, as shown in FIG. 2, the wound electrode body 20 has a flat shape. Such a wound electrode body 20 is constructed by laminating the positive electrode sheet 30 and the negative electrode sheet 40 with a total of two separator sheets 50 interposed therebetween, winding the laminate in the longitudinal direction (in other words, winding by taking a widthwise direction, which is orthogonal to the longitudinal direction, as a tightening axis), and then pressing and flattening the obtained wound body from the lateral direction.

At the time of lamination, the positive electrode sheet 30 and the negative electrode sheet 40 are overlapped with each other while being slightly shifted in the widthwise direction so that the positive electrode current collector exposed portion 33 of the positive electrode sheet 30 and the negative electrode current collector exposed portion 43 of the negative electrode sheet 40 protrude in different directions from both sides in the widthwise direction of the separator sheet 50. As a result, in the direction of the winding axis of the wound electrode body 20, the positive electrode current collector exposed portion 33 and the negative electrode current collector exposed portion 43 protrude outward from the winding core portions (that is, portions where the positive and negative electrode active material layers 34 and 44 face each other), respectively.

As shown in FIG. 1, the positive electrode terminal 60 (for example, made of aluminum) is joined to the positive electrode current collector exposed portion 33 through a positive electrode current collecting member 62, and the positive electrode 30 of the wound electrode body 20 and the positive electrode terminal 60 are electrically connected to each other. Likewise, the negative electrode terminal 70 (for example, made of nickel) is joined to the negative electrode current collector exposed portion 43 through a negative electrode current collecting member 72, and the negative electrode 40 and the negative electrode terminal 70 are electrically connected to each other. Further, the positive and negative electrode current collecting members 62, 72 and the positive and negative electrode terminals 60, 70 and the positive and negative electrode current collectors 32, 42 can be joined by ultrasonic welding, resistance welding, or the like. In this way, the wound electrode body 20 is fixed to the lid 14 and accommodated in the case body 12. The opening of the case body 12 and the lid 14 are sealed by being joined by welding or the like.

The nonaqueous electrolytic solution typically includes a support salt in a nonaqueous solvent and further includes a gas generating agent which reacts at a voltage equal to or higher than a predetermined voltage to generate a gas. This predetermined voltage is usually higher than the charging upper limit voltage of the positive electrode, and is, for example, a voltage which is higher than the charging upper limit voltage of the positive electrode by about 0.2 V to 0.6 V. The nonaqueous electrolytic solution may include various additives, for example, a film forming agent, a dispersant, and a thickener as other components as long as the effects of the present teaching are not significantly impaired.

Aprotic solvents such as carbonates, esters, and ethers can be used as the nonaqueous solvent. Among these, carbonates such as ethylene carbonate (EC), diethyl carbonate (DEC), dimethyl carbonate (DMC), and ethyl methyl carbonate (EMC) can be suitably used. Alternatively, fluorinated solvents such as fluorinated carbonates, for example, monofluoroethylene carbonate (MFEC), difluoroethylene carbonate (DFEC), monofluoromethyl difluoromethyl carbonate (F-DMC) and trifluorodimethyl carbonate (TFDMC) can be advantageously used. Such nonaqueous solvents can be used individually or two or more types thereof can be appropriately combined.

As the support salt, for example, lithium salts such as $LiPF_6$, $LiBF_4$, and $LiClO_4$ can be suitably used, and $LiPF_6$ is particularly suitable. The concentration of the support salt in the nonaqueous electrolytic solution is desirably 0.7 mol/L or more and not more than 1.3 mol/L.

A compound that reacts and generates a gas when the charging upper limit voltage of the positive electrode is exceeded and an overcharge state is reached is typically used as the gas generating agent. Specifically, an aromatic compound such as a biphenyl compound, an alkyl biphenyl compound, a cycloalkylbenzene compound, an alkylbenzene compound, an organophosphorus compound, a fluorine atom-substituted aromatic compound, a carbonate compound, a cyclic carbamate compound, and an alicyclic hydrocarbon can be suitably used.

Specific examples of the gas generating agent include biphenyl (BP), cyclohexylbenzene (CHB), 1-fluoro-2-cyclohexylbenzene, 1-fluoro-3-cyclohexylbenzene, 1-fluoro-4-cyclohexylbenzene, 1-bromo-4-cyclohexylbenzene, trans-butylcyclohexylbenzene, cyclopentylbenzene, tert-butylbenzene, 1-fluoro-4-tert-butylbenzene, 1-chloro-4-tert-butylbenzene, 1-bromo-4-tert-butylbenzene, tert-pentylbenzene, 1-fluoro-4-tert-pentylbenzene, 1-chloro-4-tert-pentylbenzene, 1-bromo-4-tert-pentylbenzene, tert-aminobenzene, terphenyl, 2-fluorobiphenyl, 3-fluorobiphenyl, 4-fluorobiphenyl, 4,4'-difluorobiphenyl, o-cyclohexylfluorobenzene, p-cyclohexylfluorobenzene, tris-(t-butylphenyl) phosphate, phenyl fluoride, 4-fluorophenyl acetate, diphenyl carbonate, methylphenyl carbonate, bis-tert-butylphenyl carbonate, diphenyl ether, and dibenzofuran. These compounds may be used individually or in appropriate combinations of two or more thereof.

Among them, at least one selected from the group consisting of biphenyl (BP) and cyclohexylbenzene (CHB) is desired. The polymerization reaction of BP and CHB is activated at a voltage of about 4.35 V to 4.6 V. Therefore, at the initial stage of overcharge, these compounds rapidly react at the positive electrode to generate hydrogen gas, so that the pressure-type safety mechanism 80 can be activated faster and more accurately at the time of overcharge.

The concentration of the gas generating agent in the nonaqueous electrolytic solution is, for example, 0.05% by mass or more and not more than 7.5% by mass, desirably 2% by mass or more and not more than 6% by mass.

For example, an aluminum foil or the like can be used as the positive electrode current collector 32 constituting the positive electrode sheet 30.

The positive electrode active material contained in the positive electrode active material layer 34 includes a first lithium transition metal composite oxide represented by the general formula $LiNi_aCo_bMn_cO_2$ wherein a, b and c are values satisfying the following conditions: $0.35 \leq a \leq 0.45$, $0.15 \leq b \leq 0.25$, $0.35 \leq c \leq 0.45$, and $a+b+c=1$, and a second lithium transition metal composite oxide represented by the general formula $LiNi_xCo_yMn_1O_2$ wherein x, y and z are values satisfying the following conditions: $0.35 \leq x \leq 0.45$, $0.45 \leq y \leq 0.55$, $0.05 \leq z \leq 0.15$, and $x+y+z=1$.

The mass ratio of the first lithium transition metal composite oxide and the second lithium transition metal composite oxide [(first lithium transition metal composite oxide):(second lithium transition metal composite oxide)] is 60:40 to 85:15.

Since the mass ratio of the first lithium transition metal composite oxide and the second lithium transition metal composite oxide is within this range, the internal resistance in the low-SOC region can be reduced. Because a simple tendency that the internal resistance is smaller at a higher content ratio of the first lithium transition metal composite oxide or a simple tendency that the internal resistance is smaller at a higher content ratio of the second lithium transition metal composite oxide is not observed, it can be said that the reduction in the internal resistance in the low-SOC region is a synergistic effect of using the first lithium transition metal composite oxide together with the second lithium transition metal composite oxide. Further, as a result of including the first lithium transition metal composite oxide, which is likely to generate a large amount of gas during overcharge, at a proportion equal to or higher than a predetermined value, the amount of gas generated during overcharge becomes sufficiently large. Therefore, when the mass ratio of the first lithium transition metal composite oxide and the second lithium transition metal composite oxide is within the above range, it is possible to obtain both a small internal resistance in the low-SOC region and a large amount of gas generated during overcharge.

The mass ratio of the first lithium transition metal composite oxide and the second lithium transition metal composite oxide [(first lithium transition metal composite oxide):(second lithium transition metal composite oxide)] is desirably 60:40 to 75:25. When the mass ratio of the first lithium transition metal composite oxide and the second lithium transition metal composite oxide is within this range, it is possible to generate gas rapidly during overcharge.

The positive electrode active material layer 34 may include components other than the active material, for example, an electrically conductive material and a binder. For example, carbon black such as acetylene black (AB) or other carbon materials (e.g., graphite) can be suitably used as the electrically conductive material. For example, polyvinylidene fluoride (PVDF) can be used as the binder.

For example, a copper foil can be used as the negative electrode current collector 42 constituting the negative electrode sheet 40. For example, a carbon material such as graphite, hard carbon, and soft carbon can be used as the negative electrode active material contained in the negative electrode active material layer 44. The negative electrode active material layer 44 may include components other than the active material, for example, a binder and a thickener. For example, a styrene butadiene rubber (SBR) can be used as the binder. For example, carboxymethyl cellulose (CMC) can be used as the thickener.

Various microporous sheets the same as or similar to those conventionally used for lithium ion secondary batteries can be used as the separator 50. For example, a microporous resin sheet made of a resin such as polyethylene (PE) and polypropylene (PP) can be used. Such a microporous resin sheet may have a single-layer structure or a multilayer structure including two or more layers (for example, a three-layer structure in which a PP layer is laminated on both surfaces of a PE layer). The separator 50 may be provided with a heat-resistant layer (HRL).

In the lithium ion secondary battery 100 configured in the above-described manner, the internal resistance in a low-SOC region (in particular, at a low temperature, for example, about 0° C.) is small and the amount of gas generated during overcharge is sufficiently large.

The lithium ion secondary battery 100 can be used for various purposes. Suitable applications include driving power sources mounted on vehicles such as electric vehicles (EV), hybrid vehicles (HV), and plug-in hybrid vehicles (PHV). Typically, the lithium ion secondary battery 100 can also be used in the form of a battery pack in which a plurality of batteries is connected in series and/or in parallel.

An angular lithium ion secondary battery including a flat wound electrode body has been described hereinabove by way of example. However, the lithium ion secondary battery disclosed herein can be constructed as a lithium ion secondary battery of another type. For example, it can be constructed as a lithium ion secondary battery including a stacked electrode body. It can also be constructed as a cylindrical lithium ion secondary battery, a laminate-type lithium ion secondary battery, or the like.

Examples relating to the present teaching will be described hereinbelow, but the present teaching is not intended to be limited to the batteries shown in the examples.

<Fabrication of Lithium Ion Secondary Battery>

[Lithium Ion Secondary Battery No. 1]

A lithium nickel cobalt manganese composite oxide represented by $LiNi_{0.4}Co_{0.2}Mn_{0.4}O_2$ was prepared as a positive electrode active material. The positive electrode active material, acetylene black (AB) as an electrically conductive material, and polyvinylidene fluoride (PVDF) as a binder were mixed at a mass ratio of the positive electrode active material:AB:PVDF=87:10:3 with N-methylpyrrolidone (NMP) to prepare a slurry for forming a positive electrode active material layer. This slurry was coated on both sides of an aluminum foil, dried, and then pressed to fabricate a positive electrode sheet.

Further, natural graphite (C) as a negative electrode active material, a styrene butadiene rubber (SBR) as a binder, and carboxymethyl cellulose (CMC) as a thickener were mixed at a mass ratio of C:SBR:CMC=98:1:1 with ion exchanged water to prepare a slurry for forming a negative electrode active material layer. This slurry was coated on both sides of a copper foil, dried, and then pressed to fabricate a negative electrode sheet.

Two separator sheets (porous polyolefin sheets) were also prepared.

The fabricated positive electrode sheet and negative electrode sheet were set opposite each other with a separator sheet interposed therebetween to fabricate an electrode body.

Current collectors were attached to the fabricated electrode body which was then accommodated in a laminate case together with a nonaqueous electrolytic solution, thereby obtaining a lithium ion secondary battery No. 1. In the nonaqueous electrolytic solution, $LiPF_6$ as a support salt was included in a nonaqueous solvent at a concentration of 1.0 mol/L and a mixture of BP and CHB as a gas generating agent was included at a concentration of about 4% by mass. A mixed solvent including ethylene carbonate (EC), dimethyl carbonate (DMC) and ethyl methyl carbonate (EMC) at a volume ratio of EC:DMC:EMC=3:4:3 was used as a nonaqueous solvent.

[Lithium Ion Secondary Battery No. 2]

A mixture of a lithium nickel cobalt manganese composite oxide represented by $LiNi_{0.4}Co_{0.2}Mn_{0.4}O_2$ and a lithium nickel cobalt manganese composite oxide represented by $LiNi_{0.4}Co_{0.5}Mn_{0.1}O_2$ was prepared as a positive electrode active material. The mass ratio (LiNi$_{0.4}$Co$_{0.2}$Mn$_{0.4}$O$_2$:LiNi$_{0.4}$Co$_{0.5}$Mn$_{0.1}$O$_2$) of the oxides was 85:15.

A lithium ion secondary battery of No. 2 was fabricated in the same manner as the lithium ion secondary battery No. 1, except that this positive electrode active material was used.

[Lithium Ion Secondary Battery No. 3]

A mixture of a lithium nickel cobalt manganese composite oxide represented by LiNi$_{0.4}$Co$_{0.2}$Mn$_{0.4}$O$_2$ and a lithium nickel cobalt manganese composite oxide represented by LiNi$_{0.4}$Co$_{0.5}$Mn$_{0.1}$O$_2$ was prepared as a positive electrode active material. The mass ratio (LiNi$_{0.4}$Co$_{0.2}$Mn$_{0.4}$O$_2$:LiNi$_{0.4}$Co$_{0.5}$Mn$_{0.1}$O$_2$) of the oxides was 75:25.

A lithium ion secondary battery of No. 3 was fabricated in the same manner as the lithium ion secondary battery No. 1, except that this positive electrode active material was used.

[Lithium Ion Secondary Battery No. 4]

A mixture of a lithium nickel cobalt manganese composite oxide represented by LiNi$_{0.4}$Co$_{0.2}$Mn$_{0.4}$O$_2$ and a lithium nickel cobalt manganese composite oxide represented by LiNi$_{0.4}$Co$_{0.5}$Mn$_{0.1}$O$_2$ was prepared as a positive electrode active material. The mass ratio (LiNi$_{0.4}$Co$_{0.2}$Mn$_{0.4}$O$_2$:LiNi$_{0.4}$Co$_{0.5}$Mn$_{0.1}$O$_2$) of the oxides was 60:40.

A lithium ion secondary battery of No. 4 was fabricated in the same manner as the lithium ion secondary battery No. 1, except that this positive electrode active material was used.

[Lithium Ion Secondary Battery No. 5]

A lithium nickel cobalt manganese composite oxide represented by LiNi$_{0.4}$Co$_{0.5}$Mn$_{0.1}$O$_2$ was prepared as a positive electrode active material.

A lithium ion secondary battery of No. 5 was fabricated in the same manner as the lithium ion secondary battery No. 1, except that this positive electrode active material was used.

[Reference Lithium Ion Secondary Battery]

A lithium nickel cobalt manganese composite oxide represented by LiNi$_{1/3}$Co$_{1/3}$Mn$_{1/3}$O$_2$ was prepared.

A reference lithium ion secondary battery was fabricated in the same manner as the lithium ion secondary battery No. 1 except that this positive electrode active material was used.

<Evaluation of Internal Resistance at Low SOC>

The fabricated lithium ion secondary batteries were subjected to initial charging and discharging. Specifically, CVCC charging (0.1 C rate, 4.1 V, 0.05 C cut-off) was performed on each fabricated lithium ion secondary battery and then CVCC discharging (0.1 C rate, 3.0 V, 0.05 C cut-off) was performed. Each lithium ion secondary batteries subjected to the initial charging and discharging was adjusted to a state with a SOC of 5% or a SOC of 10%. Next, CC discharging was performed for 10 sec at a rate of 5 C under a temperature environment of 0° C., and the internal resistance value was obtained from the slope of the primary approximate straight line of the plotted value of current (I)-voltage (V) at this time. The ratio of the internal resistance value of each of the lithium ion secondary batteries No. 1 to No. 5 was calculated by taking the internal resistance value of the reference lithium ion secondary battery as 1. The obtained values are shown in Table 1.

<Evaluation of Amount of Gas Generated During Overcharge>

The fabricated lithium ion secondary batteries were subjected to initial charging and discharging. Specifically, CVCC charging (0.1 C rate, 4.1 V, 0.05 C cut-off) was performed on each fabricated lithium ion secondary battery and then CVCC discharging (0.1 C rate, 3.0 V, 0.05 C cut-off) was performed. Next, each lithium ion secondary battery was charged until the voltage reached 4.1V. The batteries were then overcharged at a current value of 1 C under a temperature environment of 60° C. until the SOC reached 140%. A volume change caused by the overcharge was determined by the Archimedes method using Fluorinert as a solvent. The ratio of the volume increase amounts (that is, the amount of generated gas) in the lithium ion secondary batteries No. 1 to No. 5 was calculated by taking the volume increase amount (that is, the amount of generated gas) in the reference lithium ion secondary battery as 1. This ratio was taken as gas amount ratio during overcharge of SOC 140% at 60° C. The obtained values are shown in Table 2.

Likewise, the lithium ion secondary batteries were initially charged and discharged, and then charged until the voltage reached 4.1V. The batteries were then overcharged at a current value of IC under a temperature environment of 60° C. until the SOC reached 160%. A volume change caused by the overcharge was determined by the Archimedes method using Fluorinert as a solvent. The ratio of the volume increase amount (that is, the amount of generated gas) in the reference lithium ion secondary battery which was overcharged to SOC 160% under a temperature environment of 60° C. and the ratio of the volume increase amounts (that is, the amount of generated gas) in the lithium ion secondary batteries No. 1 to No. 5 was calculated by taking the volume increase amount (that is, the amount of generated gas) in the reference lithium ion secondary battery which was overcharged to SOC 140% under a temperature environment of 60° C. as 1. This ratio was taken as a gas amount ratio during overcharge of SOC 160% at 60° C. The obtained values are shown in Table 2.

The difference between the gas amount ratio during overcharge of SOC 160% and the gas amount ratio during overcharge of SOC 140% at 60° C. was determined as a gas increment for each lithium ion secondary battery. The obtained values are shown in Table 2.

TABLE 1

| Battery No. | Reference | No. 1 | No. 2 | No. 3 | No. 4 | No. 5 |
|---|---|---|---|---|---|---|
| Mass ratio* | — | 100:0 | 85:15 | 75:25 | 60:40 | 0:100 |
| Internal resistance ratio at SOC 5% | 1 | 0.818 | 0.275 | 0.288 | 0.329 | 0.552 |
| Internal resistance ratio at SOC 10% | 1 | 1.14 | 0.400 | 0.351 | 0.369 | 0.604 |

*Mass ratio (LiNi$_{0.4}$Co$_{0.2}$Mn$_{0.4}$O$_2$:LiNi$_{0.4}$Co$_{0.5}$Mn$_{0.1}$O$_2$)

TABLE 2

| Battery No. | Reference | No. 1 | No. 2 | No. 3 | No. 4 | No. 5 |
|---|---|---|---|---|---|---|
| Mass ratio* | — | 100:0 | 85:15 | 75:25 | 60:40 | 0:100 |
| Gas amount ratio during overcharge of SOC 140% at 60° C. | 1 | 1.63 | 1.23 | 1.03 | 0.88 | 0.75 |
| Gas amount ratio during overcharge of SOC 160% at 60° C. | 1.81 | 2.44 | 2.19 | 2.03 | 1.93 | 1.50 |
| Gas increment | 0.81 | 0.81 | 0.96 | 1.00 | 1.05 | 0.75 |

*Mass ratio (LiNi$_{0.4}$Co$_{0.2}$Mn$_{0.4}$O$_2$:LiNi$_{0.4}$Co$_{0.5}$Mn$_{0.1}$O$_2$)

The results in Table 1 demonstrate that the lithium ion secondary batteries No. 2 to No. 4 that used a positive electrode active material obtained by mixing the lithium nickel cobalt manganese composite oxide represented by LiNi$_{0.4}$Co$_{0.2}$Mn$_{0.4}$O$_2$ and the lithium nickel cobalt manganese composite oxide represented by LiNi$_{0.4}$Co$_{0.5}$Mn$_{0.1}$O$_2$ at a mass ratio of 60:40 to 85:15 had a low internal resistance in the low-SOC region. Further, the results in Table 2 demonstrate that the gas amount ratio during overcharge of SOC 160% at 60° C. in the lithium ion secondary batteries No. 2 to No. 4 was higher than the gas amount ratio during overcharge of SOC 160% at 60° C. in the reference lithium ion secondary battery. Further, in the lithium ion secondary batteries No. 3 and No. 4 using a positive electrode active material obtained by mixing the lithium nickel cobalt manganese composite oxide represented by $LiNi_{0.4}Co_{0.2}Mn_{0.4}O_2$ and the lithium nickel cobalt manganese composite oxide represented by $LiNi_{0.4}Co_{0.5}Mn_{0.1}O_2$ at a mass ratio of 60:40 to 75:25, the gas increment was large.

Therefore, when the positive electrode active material includes a lithium transition metal composite oxide represented by the general formula $LiNi_aCo_bMn_cO_2$ wherein a, b and c are values satisfying the following conditions: $0.35 \leq a \leq 0.45$, $0.15 \leq b \leq 0.25$, $0.35 \leq c \leq 0.45$, and $a+b+c=1$, and a lithium transition metal composite oxide represented by the general formula $LiNi_xCo_yMn_zO_2$ wherein x, y and z are values satisfying the following conditions: $0.35 \leq x \leq 0.45$, $0.45 \leq y \leq 0.55$, $0.05 \leq z \leq 0.15$, and $x+y+z=1$, and the mass ratio of oxides is 60:40 to 85:15, it is possible to provide a lithium ion secondary battery having a low internal resistance in a low-SOC region (in particular, at a low temperature) and a sufficiently large amount of gas generated during overcharge. It is also clear that when the mass ratio is 60:40 to 75:25, it is possible to generate rapidly gas during overcharge.

Although the specific examples of the present teaching have been described in detail above, these are merely exemplary and do not limit the scope of the claims. Techniques described in the claims include those in which the specific examples exemplified above are variously modified and changed.

What is claimed is:

1. A lithium ion secondary battery comprising:
an electrode body having a positive electrode and a negative electrode; and
a nonaqueous electrolytic solution,
the lithium ion secondary battery further comprising a pressure-type safety mechanism for changing an energization state according to a battery internal pressure,
wherein the nonaqueous electrolytic solution includes a gas generating agent which reacts at a voltage equal to or higher than a predetermined voltage to generate a gas,
the positive electrode has a positive electrode active material layer including a positive electrode active material,
the positive electrode active material includes a first lithium transition metal composite oxide represented by the general formula $LiNi_aCo_bMn_cO_2$ wherein a, b and c are values satisfying the following conditions: $0.35 \leq a \leq 0.45$, $0.15 \leq b \leq 0.25$, $0.35 \leq c \leq 0.45$, and $a+b+c=1$, and a second lithium transition metal composite oxide represented by the general formula $LiNi_xCo_yMn_zO_2$ wherein x, y and z are values satisfying the following conditions: $0.35 \leq x \leq 0.45$, $0.45 \leq y \leq 0.55$, $0.05 \leq z \leq 0.15$, and $x+y+z=1$, and
a mass ratio of the first lithium transition metal composite oxide and the second lithium transition metal composite oxide is 60:40 to 85:15.

2. The lithium ion secondary battery according to claim 1, wherein the mass ratio of the first lithium transition metal composite oxide and the second lithium transition metal composite oxide is 60:40 to 75:25.

* * * * *